(12) United States Patent
Li et al.

(10) Patent No.: US 10,641,605 B2
(45) Date of Patent: May 5, 2020

(54) APPARATUSES AND METHODS FOR MEASURING A CLEARANCE

(71) Applicants: BOE Technology Group Co., Ltd., Beijing (CN); Beijing BOE Display Technology Co., Ltd., Beijing (CN)

(72) Inventors: Xianglong Li, Beijing (CN); Xiaoran Duan, Beijing (CN); Changkai Zhao, Beijing (CN); Quanyue Li, Beijing (CN); Feng He, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 330 days.

(21) Appl. No.: 15/679,698

(22) Filed: Aug. 17, 2017

(65) Prior Publication Data
US 2018/0188023 A1 Jul. 5, 2018

(30) Foreign Application Priority Data
Jan. 5, 2017 (CN) .......................... 2017 1 0006500

(51) Int. Cl.
*G01B 5/14* (2006.01)
*G01B 21/16* (2006.01)
(Continued)

(52) U.S. Cl.
CPC ................ *G01B 21/16* (2013.01); *G01B 5/14* (2013.01); *G01B 7/023* (2013.01); *G01B 11/026* (2013.01); *G01B 11/14* (2013.01); *G01B 17/02* (2013.01)

(58) Field of Classification Search
CPC .......... G01B 5/14; G01B 11/14; G01B 21/16; G01B 7/023
See application file for complete search history.

(56) References Cited

U.S. PATENT DOCUMENTS 5,209,091 A * 5/1993 Koenigbauer ....... B21D 37/142
100/48

FOREIGN PATENT DOCUMENTS

CN 202853539 U 4/2013
DE 19802499 A1 * 7/1999 ............. A61B 6/544
(Continued)

OTHER PUBLICATIONS

Office Action, including Search Report, for Chinese Patent Application No. 201710006500.X, dated Apr. 12, 2019, 9 pages.

*Primary Examiner* — Matthew G Marini
*Assistant Examiner* — Ruben C Parco, Jr.
(74) *Attorney, Agent, or Firm* — Westman, Champlin & Koehler, P.A.

(57) ABSTRACT

The present disclosure provides an apparatus and method for measuring a clearance. The apparatus comprises: a first measurement component configured to be mounted on a first object in a mounted state thereof, so that a first measurement surface of the first measurement component is aligned with a first surface to be measured of the first object; and a second measurement component configured to be mounted on a second object in a mounted state thereof, so that a second measurement surface of the second measurement component is aligned with a second surface to be measured of the second object, wherein the first measurement component comprises a measurement instrument configured to measure a first distance between the measurement instrument and the first measurement surface and a second distance between the measurement instrument and the second measurement surface, wherein the clearance is calculated based on the first distance and the second distance.

17 Claims, 4 Drawing Sheets

(51) Int. Cl.
*G01B 7/02* (2006.01)
*G01B 11/02* (2006.01)
*G01B 11/14* (2006.01)
*G01B 17/02* (2006.01)

(56) References Cited

FOREIGN PATENT DOCUMENTS

| | | | | |
|---|---|---|---|---|
| JP | 06185942 A | * | 7/1994 | |
| JP | 2008303873 A | * | 12/2008 | ............. G02B 21/16 |

* cited by examiner

APPARATUSES AND METHODS FOR MEASURING A CLEARANCE

CROSS-REFERENCE TO RELATED APPLICATION(S)

The present application claims priority to the Chinese Patent Application No. 201710006500.X, filed on Jan. 5, 2017, entitled "APPARATUSES AND METHODS FOR MEASURING A CLEARANCE," which is incorporated herein by reference in its entirety.

TECHNICAL FIELD

The present disclosure relates to the field of industrial production and processing, and more particularly, to an apparatus for measuring a clearance and a method for measuring a clearance using the apparatus.

BACKGROUND

In production and processing flows in various industries, measurement operations are essential, and measurement accuracy directly affects levels of the entire flows. In some cases, if there is a large offset in a measurement result, it may directly lead to processed products or produced equipment scrapped, thereby resulting in huge losses.

For example, in the Thin Film Transistor-Liquid Crystal Display (TFT-LCD) industry, in a process of production of a liquid crystal panel, it is one of the important flows to grind a glass chip, which achieves the effect of removing foreign matters on upper and lower surfaces of the panel by using a grinding head to drive a grinding belt to rotate directionally. A grinding effect directly determines the yield of the entire production process, and is largely determined by a size of a grinding clearance. For liquid crystal panels with different thicknesses, grinding clearances which are used are often different. Therefore, it needs to select a size of the grinding clearance according to a thickness of a liquid crystal panel before grinding, which requires accurate measurement of the grinding clearance. In the conventional method for measuring a grinding clearance, the grinding clearance is measured by an operator using a feeler. Because of an error caused by the feeler itself and an error manually caused by the operator, the measurement method may result in a large error and a long time delay, which are not beneficial to the product quality and production efficiency of the whole production line.

SUMMARY

In order to solve the problems in the prior art, the present disclosure proposes an apparatus and method for measuring a clearance.

According to an aspect of the present disclosure, there is provided an apparatus for measuring a clearance. The clearance is defined by a first surface to be measured of a first object and a second surface to be measured of a second object. The apparatus for measuring a clearance comprises: a first measurement component configured to be mounted on the first object in a mounted state thereof, so that a first measurement surface of the first measurement component is aligned with the first surface to be measured of the first object; and a second measurement component configured to be mounted on the second object in a mounted state thereof, so that a second measurement surface of the second measurement component is aligned with the second surface to be measured of the second object, wherein the first measurement component comprises a measurement instrument configured to measure a first distance between the measurement instrument itself and the first measurement surface of the first measurement component and a second distance between the measurement instrument itself and the second measurement surface of the second measurement component, wherein the clearance is calculated based on the first distance and the second distance.

In an embodiment, the first measurement component further comprises: a first body defining the first measurement surface; a first fixing plate disposed on a front surface of the first body; and a first stopper baffle connected to the first fixing plate and aligned with the first measurement surface. The first stopper baffle is able to rotate in a plane parallel to the first measurement surface around a junction between the first stopper baffle and the first fixing plate.

In an embodiment, when the first measurement component is in the mounted state, one end of the first stopper baffle protrudes from a rear surface of the first body along the first measurement surface.

In an embodiment, the first measurement component further has the measurement state, and the first stopper baffle is orthogonal to a line from the measurement instrument which is perpendicular to the first measurement surface when the first measurement component is in the measurement state.

In an embodiment, the measurement instrument determines the first distance by measuring a distance between the measurement instrument itself and the first stopper baffle.

In an embodiment, the first body has a slide rail provided thereon, and the first fixing plate and/or the measurement instrument are movably disposed on the first body through the slide rail.

In an embodiment, the second measurement component further comprises: a second body defining the second measurement surface; and a second stopper baffle connected to the second body and aligned with the second measurement surface. The second stopper baffle is able to rotate in a plane parallel to the second measurement surface around a junction between the second stopper baffle and the second body.

In an embodiment, when the second measurement component is in the mounted state, one end of the second stopper baffle protrudes from a rear surface of the second body along the second measurement surface.

In an embodiment, the measurement instrument determines the second distance by measuring a distance between the measurement instrument itself and the second body.

In an embodiment, the measurement instrument is a contact measurement instrument comprising a contact protruding from the measurement instrument in a direction toward the first measurement surface.

In an embodiment, the first measurement component and the second measurement component are mounted on the first object and the second object by magnetic force, respectively.

According to another aspect of the present disclosure, there is provided a method for measuring a clearance using the apparatus for measuring a clearance according to the various embodiments described above. The method comprises the following steps: fixing the first measurement component to the front surface of the first object in a case that the first measurement component is in a mounted state, so that the first stopper baffle is in close contact with the first surface to be measured of the first object; fixing the second measurement component to the front surface of the second object in a case that the second measurement component is in a mounted state, so that the second stopper baffle is in close contact with the second surface to be measured of the second object; measuring a distance between the measurement instrument and the first stopper baffle to determine the first distance in a case that the first measurement component is in a measurement state; measuring a distance between the measurement instrument and the second body of the second measurement component to determine the second distance in a case that the first stopper baffle is moved away so that the first measurement component is not in the measurement state; and calculating the clearance defined by the first surface to be measured of the first object and the second surface to be measured of the second object based on the first distance and the second distance.

In an embodiment, when the first measurement component is in the mounted state, one end of the first stopper baffle protrudes from a rear surface of the first body along the first measurement surface.

In an embodiment, the first stopper baffle is orthogonal to a line from the measurement instrument which is perpendicular to the first measurement surface when the first measurement component is in a measurement state.

In an embodiment, the first body has a slide rail provided thereon, and the first fixing plate and/or the measurement instrument are movably disposed on the first body through the slide rail.

In an embodiment, when the second measurement component is in the mounted state, one end of the second stopper baffle protrudes from a rear surface of the second body along the second measurement surface.

In an embodiment, the measurement instrument is a contact measurement instrument comprising a contact protruding from the measurement instrument in a direction toward the first measurement surface.

In an embodiment, the first measurement component and the second measurement component are mounted on the first object and the second object by magnetic force, respectively.

DETAILED DESCRIPTION

The specific embodiments of the present disclosure will be described in detail below. It should be noted that the embodiments herein are used for illustration only, without limiting the present disclosure. In the description below, a number of specific details are explained to provide better understanding of the present disclosure. However, it is apparent to those skilled in the art that the present disclosure can be implemented without these specific details. In other instances, well known structures, materials or methods are not described specifically so as not to obscure the present disclosure.

Throughout the specification, the reference to "one embodiment," "an embodiment," "one example" or "an example" means that the specific features, structures or properties described in conjunction with the embodiment or example are included in at least one embodiment of the present disclosure. Therefore, the phrases "in one embodiment," "in an embodiment," "in one example" or "in an example" occurred in various positions throughout the specification may not necessarily refer to the same embodiment or example. Furthermore, specific features, structures or properties may be combined into one or more embodiments or examples in any appropriate combination and/or sub-combination. Moreover, it should be understood by those skilled in the art that the accompanying drawings provided here are for the purpose of illustration and are not necessarily to be drawn to scale. The term "and/or" used herein means any and all combinations of one or more listed items.

The present disclosure will be described in detail below with reference to the accompanying drawings.

Figure 1:
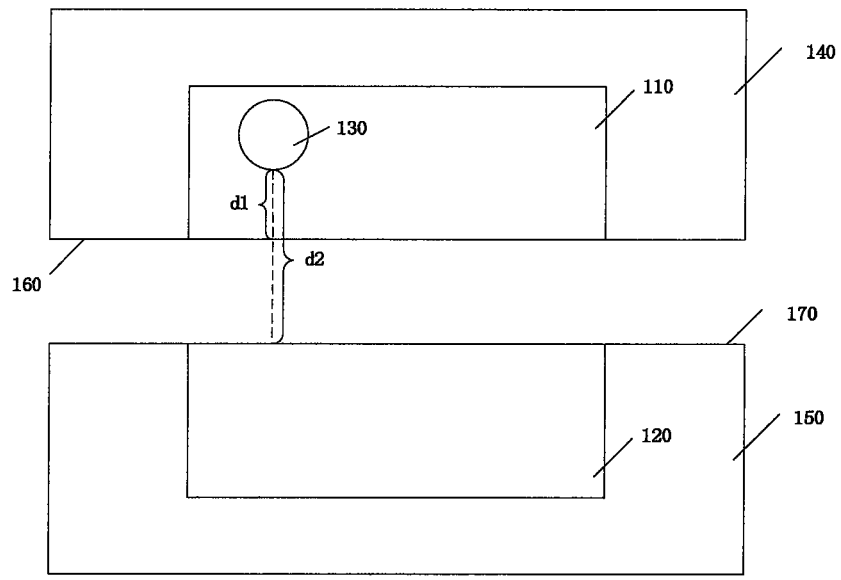
FIG. 1 illustrates a structural diagram of an apparatus for measuring a clearance which has been mounted according to an embodiment.

FIG. 1 illustrates a structural diagram of an apparatus 100 for measuring a clearance which has been mounted according to an embodiment.

As shown in FIG. 1, the apparatus 100 for measuring a clearance comprises a first measurement component 110, a second measurement component 120 and a measurement instrument 130.

FIG. 1 further illustrates a first object 140 and a second object 150. The first object 140 comprises a first surface 160 to be measured, and the second object 150 comprises a second surface 170 to be measured. The first surface 160 to be measured and the second surface 170 to be measured define a clearance to be measured.

In an embodiment, the first surface 160 to be measured and the second surface 170 to be measured are flat surfaces. In other embodiments, the first surface 160 to be measured and the second surface 170 to be measured may also be other types of surfaces.

In FIG. 1, the first measurement component 110 has been mounted on the first object 140 in a mounted state thereof, and comprises a first measurement surface. The second measurement component 120 has been mounted on the second object 150 in a mounted state thereof, and comprises a second measurement surface. The first measurement surface is aligned with the first surface 160 to be measured in a case that the first measurement component 110 is mounted on the first object 140. The second measurement surface is aligned with the second surface 170 to be measured in a case that the second measurement component 120 is mounted on the second object 150. In FIG. 1, the first measurement surface is shown to be coincident with the first surface 160 to be measured and the second measurement surface is shown to be coincident with the second surface 170 to be measured, respectively, due to the alignment positional relationships.

A measurement instrument 130 is located on the first measurement component 110. The measurement instrument 130 may be attached to a front surface of the first measurement component 110, embedded in the first measurement component 110, or associated with the first measurement component 110 by other means of connection. The measurement instrument 130 is used to measure a first distance d1 between the measurement instrument itself and the first measurement surface of the first measurement component 110 and a second distance d2 between the measurement instrument itself and the second measurement surface of the second measurement component 120. The measured first distance d1 and second distance d2 are used to calculate the clearance.

The measurement instrument 130 may be implemented in a variety of different structures and may perform measurements using a number of different mechanisms. In an embodiment, the measurement instrument 130 may be a contact measurement instrument (shown as the measurement instrument 130 in FIG. 2 below). The contact measurement instrument comprises a contact protruding from the contact measurement instrument in a direction toward the first measurement surface. When the contact comes into contact with a specific surface, a distance between the measurement instrument and the specific surface may be read from the contact measurement instrument to achieve distance measurement. In another embodiment, the measurement instrument 130 may also be implemented as an infrared distance measurement instrument, an ultrasonic distance measurement instrument, a laser distance measurement instrument etc. Preferably, an extension direction of the contact is perpendicular to the first measurement surface.

In an embodiment, the first measurement component 110 and the second measurement component 120 are mounted on the first object 140 and the second object 150 by magnetic force, respectively.

It is to be noted that the apparatus 100 for measuring a clearance shown in FIG. 1 may be used for various measurement scenarios depending on practical objects represented by the first object 140 and the second object 150. For example, the apparatus 100 for measuring a clearance may be used for a glass grinding scenario when the first object 140 and the second object 150 correspond to upper and lower grinding heads used during glass grinding, respectively.

Figure 2:
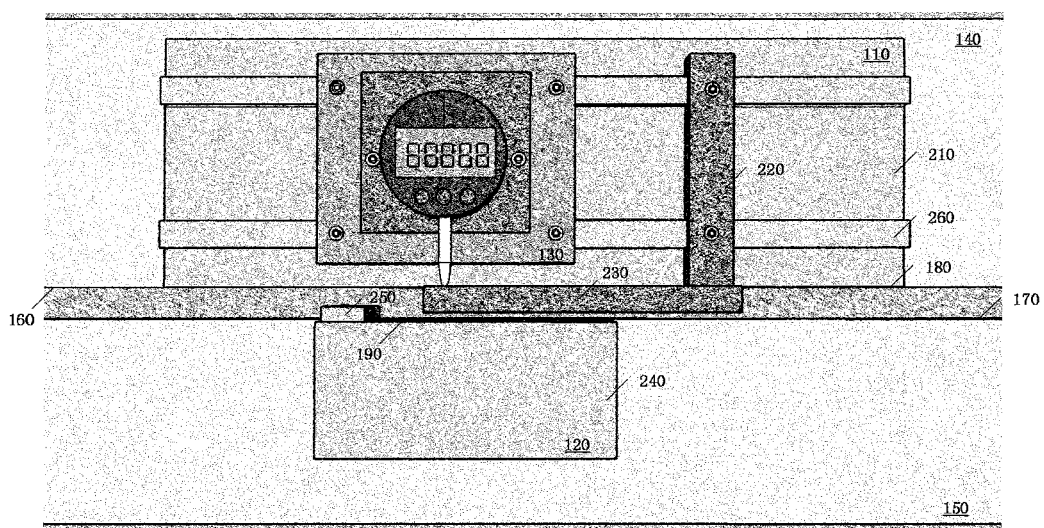
FIG. 2 illustrates a more detailed structural diagram of an apparatus for measuring a clearance according to an embodiment.

FIG. 2 illustrates a more detailed structural diagram of an apparatus 200 for measuring a clearance according to an embodiment.

As shown in FIG. 2, the first measurement component 110 comprises a first body 210, a first fixing plate 220 and a first stopper baffle 230.

The first body 210 defines a first measurement surface 180. The first fixing plate 220 is disposed on a front surface of the first body 210. The first stopper baffle 230 is connected to the first fixing plate 220 and is aligned with the first measurement surface 180. The first stopper baffle 230 is able to rotate in a plane parallel to the first measurement surface 180 around a junction between the first stopper baffle 230 and the first fixing plate 220.

In an embodiment, the first body 210 has a slide rail 260 provided thereon. The first fixing plate 220 and/or the measurement instrument 130 are movably disposed on the first body 210 through the slide rail and is able to move along the slide rail 260 in a direction parallel to the first measurement surface 180 as required.

The second measurement component 120 comprises a second body 240 and a second stopper baffle 250. The second body 240 defines a second measurement surface 190. The second stopper baffle 250 is connected to the second body 240 and is aligned with the second measurement surface 190. The second stopper baffle 250 is able to rotate in a plane parallel to the second measurement surface 190 around a junction and the second stopper baffle 250 and the second body 240.

In an embodiment, a thickness of the second body 240 is greater than a thickness of the first body 210.

Figure 3:
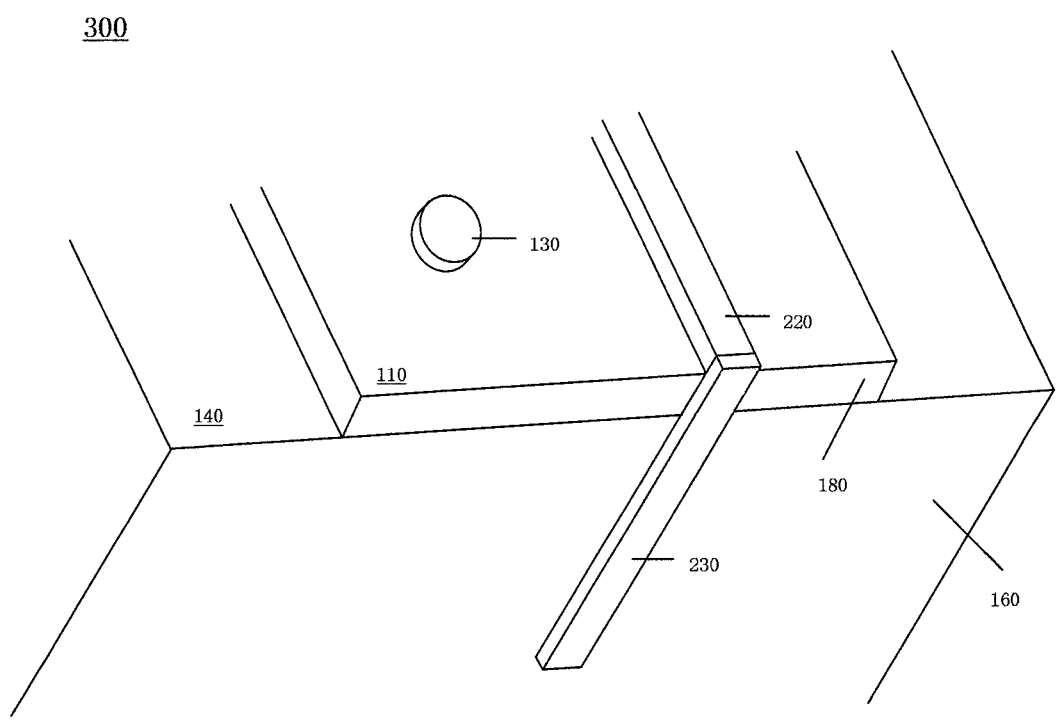
FIG. 3 illustrates a diagram of an exemplary scenario in which a first measurement component is in a mounted state.

FIG. 3 illustrates a diagram of a detailed structure 300 of the first measurement component 110 in a mounted state. It can be seen from FIG. 3 that when the first measurement component 110 is in the mounted state, one end of the first stopper baffle 230 protrudes from a rear surface of the first body 210 along the first measurement surface 180. In this mounted state, the first measurement component 110 may be mounted on the first object 140. That is, FIG. 3 illustrates a scenario in which the first measurement component 110 is mounted on the first object 140 when the first measurement component 110 is in the mounted state. A portion of the first stopper baffle 230 protruding from the rear surface of the first body 210 is in close contact with the first surface 160 to be measured of the first object 140.

A mounted state of the second measurement component 120 is similar to that of the first measurement component 110. When the second measurement component 120 is in the mounted state, one end of the second stopper baffle 250 protrudes from a rear surface of the second body 240 along the second measurement surface 190. Similarly, when the second measurement component 120 is in the mounted state, the second measurement component 120 may be mounted on the second object 150. When the second measurement component 120 is mounted on the second object 150, similarly to the scenario in which the first measurement component 110 is mounted in FIG. 3, a portion of the second stopper baffle 250 protruding from the rear surface of the second body 240 is in close contact with the second surface 170 to be measured of the second object 150.

In an embodiment, the first measurement component 110 further has a measurement state. Returning back to FIG. 2 again, the first measurement component 110 in FIG. 2 is in the measurement state. The first stopper baffle 230 is orthogonal to a line from the measurement instrument 130 which is perpendicular to the first measurement surface 180. The condition that the first stopper baffle 230 is orthogonal to the perpendicular line ensures that the measurement instrument 130 can measure a distance between the measurement instrument 130 itself and the first stopper baffle 230 when the first measurement component 110 is in the measurement state. As a surface of the first stopper baffle 230 is aligned with the first measurement surface 180, the distance may be determined as the first distance d1 between the measurement instrument 130 and the first measurement surface 180. Preferably, in the measurement state, the first stopper baffle 230 is caused to be aligned with an intersection line between the front surface of the first body 210 and the first measurement surface 180.

In an embodiment, the distance between the measurement instrument 130 and the second body 240 may be measured by the measurement instrument 130 itself. In this case, it needs to move the first stopper baffle 230 away so that the first measurement component 110 is not in the measurement state, and the second measurement surface 190 of the second body 240 may be orthogonal to a line from the measurement instrument 130 which is perpendicular to the second measurement surface 190. Thus, the distance between the measurement instrument 130 and the second measurement surface 190 of the second body 240, i.e., the second distance d2, may be measured by the measurement instrument 130 itself.

After obtaining the first distance d1 and the second distance d2, a surveyor may calculate a value of the clearance according to, for example, d2−d1.

In an alternative embodiment, an offset value c may be preset so as to calculate the value of the clearance according to d2−d1−c. For example, in a glass grinding scenario, a final desired grinding clearance is actually a distance between grinding bands tied to grinding heads (corresponding to the first object and the second object). There is a predetermined distance c/2 between the grinding belts and the grinding heads. Thus, it needs to subtract two predetermined distances, i.e., c, in determining the value of the glass grinding clearance.

In an embodiment, the first stopper baffle 230 and/or the second stopper baffle 250 are removable.

Figure 4:
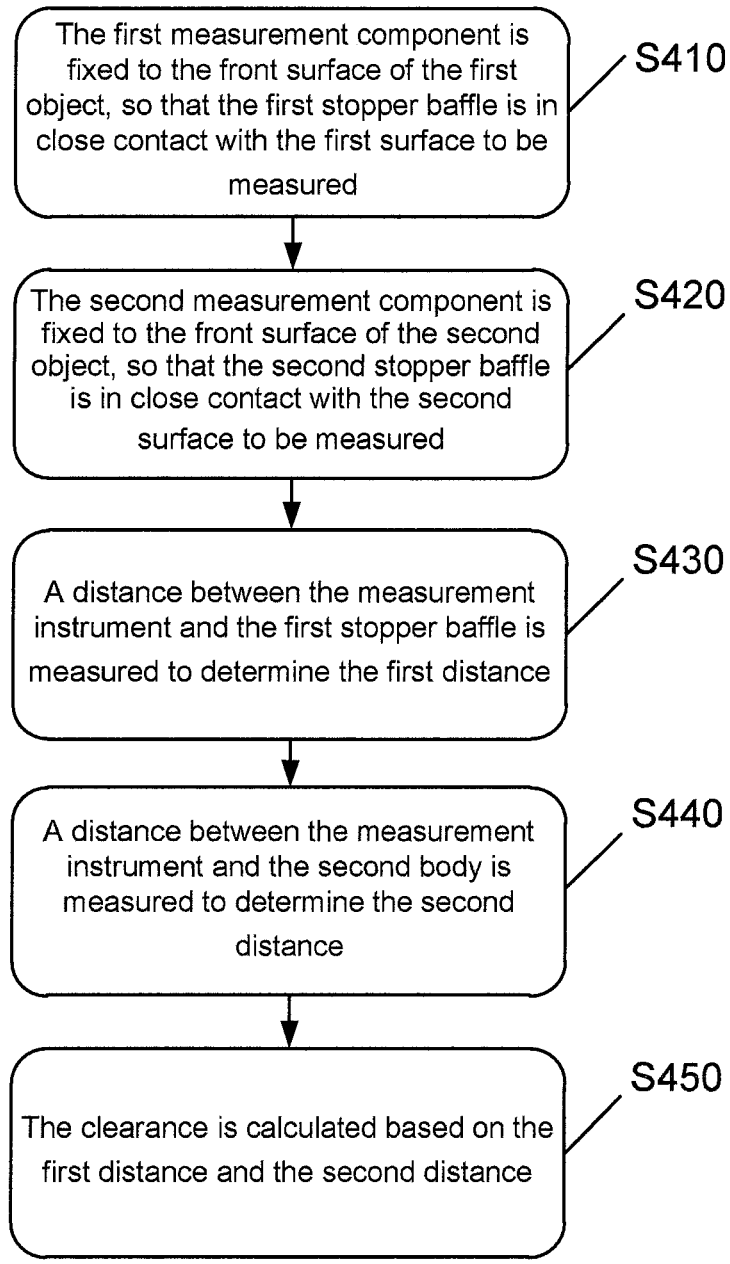
FIG. 4 illustrates a flowchart of a method for measuring a clearance according to an embodiment.

FIG. 4 illustrates a flowchart of a method 400 for measuring a clearance using the apparatus for measuring a clearance described above with reference to FIGS. 1-3 according to an embodiment.

The method 400 comprises the following steps.

In step S410, the first measurement component 110 is fixed to the front surface of the first object 140 in a case that the first measurement component 110 is in a mounted state, so that the first stopper baffle 230 is in close contact with the first surface 160 to be measured of the first object 140.

In this step, the first measurement component 110 needs to be placed in the mounted state to ensure that the first stopper baffle 230 may be in close contact with the first surface 160 to be measured. Thus, the first measurement surface 180 is aligned with the first surface 160 to be measured when the first stopper baffle 230 is in close contact with the first surface 160 to be measured.

In step S420, the second measurement component 120 is fixed to the front surface of the second object 150 in a case that the second measurement component 120 is in a mounted state, so that the second stopper baffle 250 is in close contact with the second surface 170 to be measured of the second object 150.

In this step, the second measurement component 120 needs to be placed in the mounted state to ensure that the second stopper baffle 250 may be in close contact with the second surface 170 to be measured. Thus, the second measurement surface 190 is aligned with the second surface 170 to be measured.

In step S430, a distance between the measurement instrument 130 and the first stopper baffle 230 is measured to determine the first distance d1 in a case that the first measurement component 110 is in the measurement state.

In this step, the first measurement component 110 is placed in a mounted state so that a distance between the measurement instrument 130 and the first stopper baffle 230 may be measured by the measurement instrument 130 itself. For example, when the measurement instrument 130 is a contact measurement instrument, it needs to ensure that the protruded contact can touch the first stopper baffle 230.

In step S440, a distance between the measurement instrument 130 and the second body 240 of the second measurement component 120 is measured to determine the second distance d2 in a case that the first stopper baffle 230 is moved away so that the first measurement component 110 is not in the measurement state.

In this step, in order to measure the distance between the measurement instrument 130 and the second body 240, it needs to move the first stopper baffle 230 away. For example, when the measurement instrument 130 is a contact measurement instrument, it needs to ensure that the protruded contact is not blocked by the first stopper baffle 230 and can touch the surface of the second body 240.

In step S450, the clearance defined by the first surface 160 to be measured of the first object 140 and the second surface 170 to be measured of the second object 150 is calculated based on the first distance d1 and the second distance d2.

The foregoing detailed description has set forth various embodiments via the use of diagrams, flowcharts, and/or examples. In a case that such diagrams, flowcharts, and/or examples contain one or more functions and/or operations, it will be understood by those skilled in the art that each function and/or operation within such diagrams, flowcharts or examples may be implemented, individually and/or collectively, by a wide range of structures, hardware, software, firmware, or virtually any combination thereof. In one embodiment, several portions of the subject matter described in the embodiments of the present disclosure may be implemented via Application Specific Integrated Circuits (ASICs), Field Programmable Gate Arrays (FPGAs), Digital Signal Processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of those skilled in the art in ray of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

While the present disclosure has been described with reference to several typical embodiments, it is apparent to those skilled in the art that the terms are used for illustration and explanation purpose and not for limitation. The present disclosure may be practiced in various forms without departing from the spirit or essence of the present disclosure. It should be understood that the embodiments are not limited to any of the foregoing details, and shall be interpreted broadly within the spirit and scope as defined by the following claims. Therefore, all of modifications and alternatives falling within the scope of the claims or equivalents thereof are to be encompassed by the claims as attached.

We claim:

1. An apparatus for measuring a clearance defined by a first surface of a first object and a second surface of a second object, the apparatus comprising:
   a first measurement component configured to be mounted on the first object in a mounted state thereof, so that a first measurement surface of the first measurement component is aligned with the first surface of the first object; and
   a second measurement component configured to be mounted on the second object in a mounted state thereof, so that a second measurement surface of the second measurement component is aligned with the second surface of the second object,
   wherein the first measurement component comprises a measurement instrument configured to measure a first distance between the measurement instrument and the first measurement surface of the first measurement component and a second distance between the measurement instrument and the second measurement surface of the second measurement component, wherein the clearance is calculated based on the first distance and the second distance;

wherein the first measurement component further comprises:
a first body defining the first measurement surface;
a first fixing plate disposed on a front surface of the first body; and
a first stopper baffle connected to the first fixing plate and aligned with the first measurement surface, wherein the first stopper baffle is able to rotate in a plane parallel to the first measurement surface around a junction between the first stopper baffle and the first fixing plate.

2. The apparatus according to claim 1, wherein when the first measurement component is in the mounted state, one end of the first stopper baffle protrudes from a rear surface of the first body along the first measurement surface.

3. The apparatus according to claim 1, wherein the first measurement component further has a measurement state, and the first stopper baffle is orthogonal to a line from the measurement instrument which is perpendicular to the first measurement surface when the first measurement component is in the measurement state.

4. The apparatus according to claim 1, wherein the measurement instrument determines the first distance by measuring a distance between the measurement instrument and the first stopper baffle.

5. The apparatus according to claim 1, wherein the first body has a slide rail provided thereon, and the first fixing plate and/or the measurement instrument are movably disposed on the first body through the slide rail.

6. The apparatus according to claim 1, wherein the second measurement component further comprises:
a second body defining the second measurement surface; and
a second stopper baffle connected to the second body and aligned with the second measurement surface, wherein the second stopper baffle is able to rotate in a plane parallel to the second measurement surface around a junction between the second stopper baffle and the second body.

7. The apparatus according to claim 6, wherein when the second measurement component is in the mounted state, one end of the second stopper baffle protrudes from a rear surface of the second body along the second measurement surface.

8. The apparatus according to claim 6, wherein the measurement instrument determines the second distance by measuring a distance between the measurement instrument and the second body.

9. The apparatus according to claim 1, wherein the measurement instrument is a contact measurement instrument comprising a contact protruding from the measurement instrument in a direction toward the first measurement surface.

10. The apparatus according to claim 1, wherein the first measurement component and the second measurement component are mounted on the first object and the second object by magnetic force, respectively.

11. A method for measuring a clearance using the apparatus for measuring a clearance according to claim 1, wherein the second measurement component further comprises: a second body defining the second measurement surface and a second stopper baffle connected to the second body and aligned with the second measurement surface, wherein the second stopper baffle is able to rotate in a plane parallel to the second measurement surface around a junction between the second stopper baffle and the second body, the method comprising:
fixing the first measurement component to the front surface of the first object in a case that the first measurement component is in a mounted state, so that the first stopper baffle is in close contact with the first surface to be measured of the first object;
fixing the second measurement component to the front surface of the second object in a case that the second measurement component is in a mounted state, so that the second stopper baffle is in close contact with the second surface to be measured of the second object;
measuring a distance between the measurement instrument and the first stopper baffle to determine the first distance in a case that the first measurement component is in a measurement state;
measuring a distance between the measurement instrument and the second body of the second measurement component to determine the second distance in a case that the first stopper baffle is moved away so that the first measurement component is not in the measurement state; and
calculating the clearance defined by the first surface to be measured of the first object and the second surface to be measured of the second object based on the first distance and the second distance.

12. The method according to claim 11, wherein when the first measurement component is in the mounted state, one end of the first stopper baffle protrudes from a rear surface of the first body along the first measurement surface.

13. The method according to claim 11, wherein the first stopper baffle is orthogonal to a line from the measurement instrument which is perpendicular to the first measurement surface when the first measurement component is in a measurement state.

14. The method according to claim 11, wherein the first body has a slide rail provided thereon, and the first fixing plate and/or the measurement instrument are movably disposed on the first body through the slide rail.

15. The method according to claim 11, wherein when the second measurement component is in the mounted state, one end of the second stopper baffle protrudes from a rear surface of the second body along the second measurement surface.

16. The method according to claim 11, wherein the measurement instrument is a contact measurement instrument comprising a contact protruding from the measurement instrument in a direction toward the first measurement surface.

17. The method according to claim 11, wherein the first measurement component and the second measurement component are mounted on the first object and the second object by magnetic force, respectively.

* * * * *